M. C. SOUTH.
POWER PROPULSION DEVICE.
APPLICATION FILED SEPT. 6, 1921.

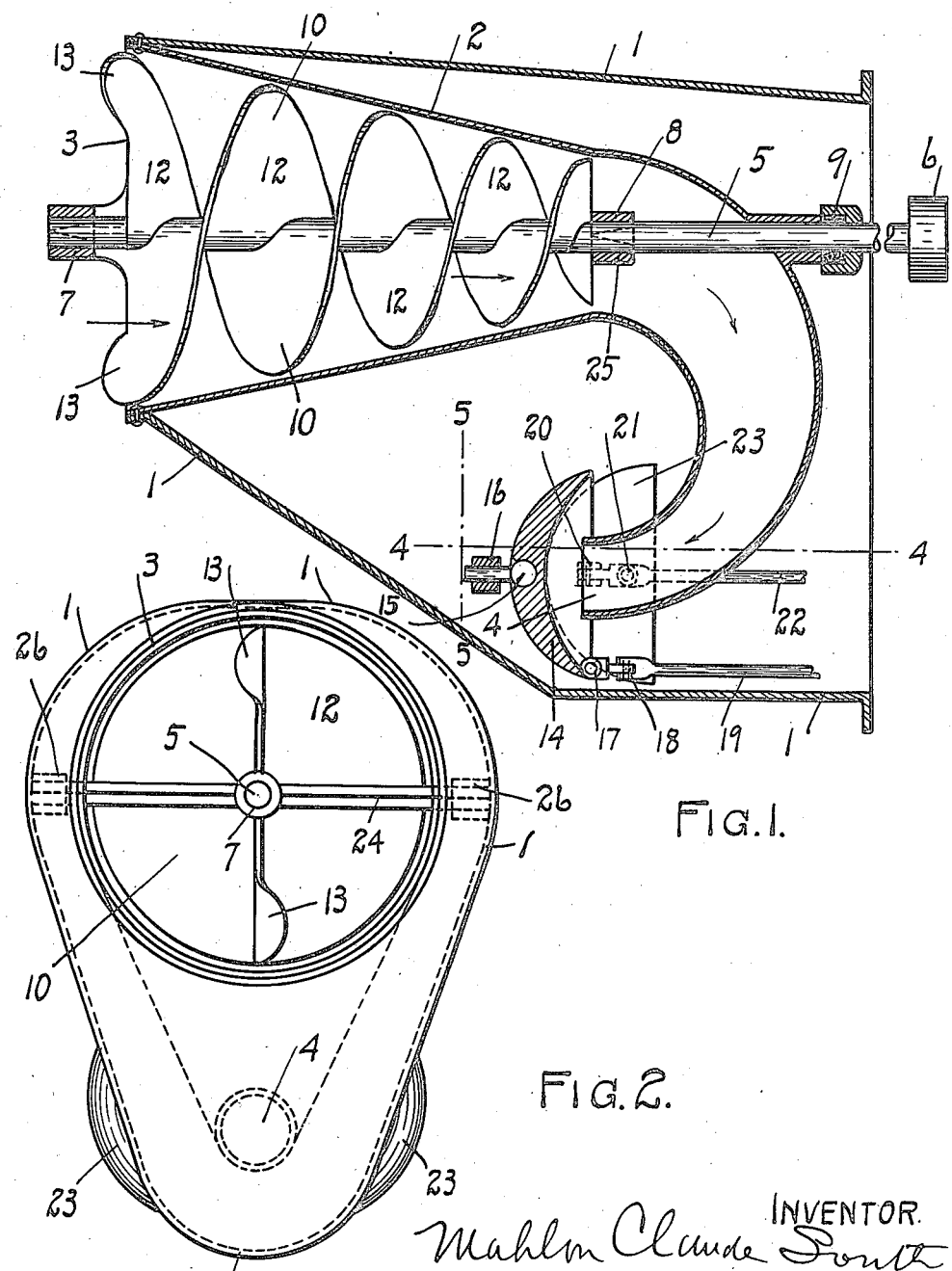

1,422,384.

Patented July 11, 1922.
2 SHEETS—SHEET 2.

INVENTOR.
Mahlon Claude South
by John M. Streher
ATTORNEY.

UNITED STATES PATENT OFFICE.

MAHLON CLAUDE SOUTH, OF CINCINNATI, OHIO, ASSIGNOR OF ONE-THIRD TO CASSIUS M. GARRISON, OF CINCINNATI, OHIO.

POWER PROPULSION DEVICE.

1,422,384.   Specification of Letters Patent.   Patented July 11, 1922.

Application filed September 6, 1921. Serial No. 498,781.

*To all whom it may concern:*

Be it known that I, MAHLON CLAUDE SOUTH, a citizen of the United States, residing at the city of Cincinnati, in the county of Hamilton and State of Ohio, have invented certain new and useful Improvements in Power Propulsion Devices, of which the following is a specification.

My invention relates more particularly to devices or apparatus for auxiliary power, steering and guiding means and the like for aeroplanes, flying machines, certain classes of boats and vessels, and generally any craft or vehicle used in the air or on the water, to which it is possible and practical to apply the same, and its features and advantages will be set forth in the following specification.

In the accompanying drawing forming part of this specification:

Fig. 1, is a sectional view on the line 1—1 of Fig. 3,

Fig. 2, is a front view, in elevation,

Figure 3:
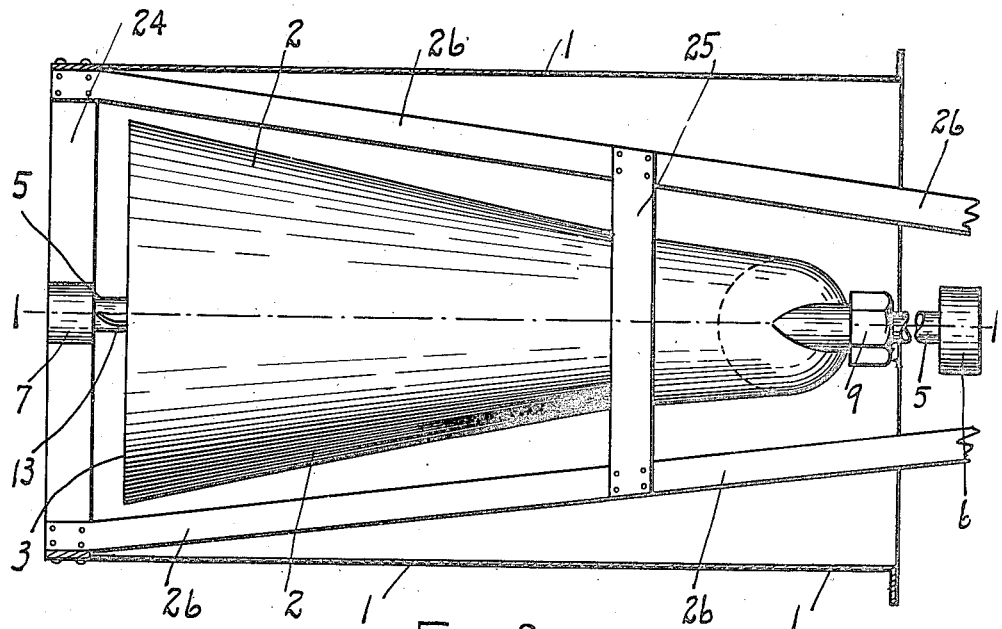
Fig. 3, is a plan view, the casing being shown in section.
Figure 5:
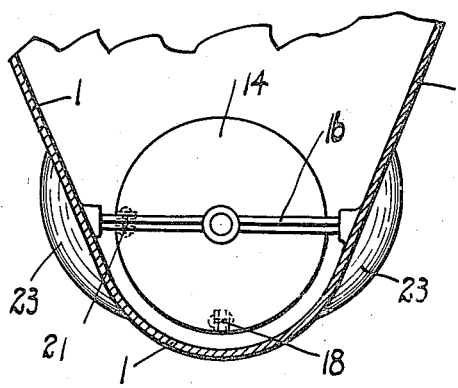
Fig. 5, is a section taken on the line 5—5 of Fig. 1.
Figure 4:
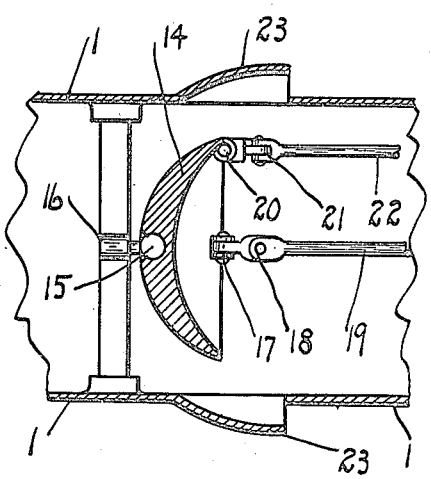
Fig. 4, is a section taken on the line 4—4 of Fig. 1.

The working parts of the device are usually placed in a casing as 1, and in the present instance are shown applied to an aeroplane, at the front end thereof; this being the specific means used for the present description. This casing may be of any contour or shape best adapted for practical use. In this casing I place and properly support a horn-shaped element 2, widest at its mouth 3 and smaller at its exit orifice 4, the element tapering from its mouth to its exit orifice, as shown. In the upper part of this horn element I locate a shaft 5, provided at one end with a drive pulley 6, supported in a journal 7 at its forward end and at its rear journaled in journal 8 and between this latter journal and the pulley 6, I place a peculiarly shaped stuffing box 9 to provide an air tight joint.

On the shaft 5, I place a screw 10, either made integral with said shaft or tightly connected thereto; the blades on this screw being marked 12, and each succeeding blade being less in diameter and extent than the one before it, thus the screw may be said to be of a tapering form, the horn also conforming to the screw in its tapering form.

At the forward end of screw 10, near the mouth 3 of the horn 2, I place two ears 13, although I may use any number found practical.

Directly in front of the orifice 4, I place a cup or dish-shaped disc 14 loosely mounted on a ball or universal joint 15, so that the same will turn, shift or tilt to assume different and varying altitudes. This ball joint 15 is supported in a cross-bar 16, preferably of a V shape.

At the lower line of disk 14, at the point 17, I place a universal joint 18, carrying one end of a guide or steering rod 19 and at the side of said disk, at point 20, I place a universal joint 21, carrying one end of a steering rod 22, in other words, the steering rods are connected to and supported in said universal joints at their ends.

At the lower part of the casing 1, at its sides, I place air cut-outs or exhausts 23, 23, for the escape of exhaust air.

For the casing 1, I provide V shaped beams as 20, at the front, and at the middle, provide the V shaped beams 25; these beams run cross-wise and are attached to the longitudinally disposed beams 26, 26.

The pulley 6 and consequently the shaft 5 and screw 10, are revolved rapidly by the motive power of the aeroplane, this part not being shown herein, as it is well known in the art. This device being at the front of the machine and rapidly traveling through the air, said air is drawn or sucked into the horn 2 through the mouth 3 and thus drawn further into the horn 2 and is compressed and forced out through the orifice 4, in great force and density.

The guide or steering rods 19 and 22 are connected at their opposite ends to the steering or pilot mechanism of the aeroplane.

Supposing this apparatus is placed at the front of an aeroplane and the pulley 6 is revolved by the motor, motion being thus transmitted to the shaft 5 which revolves swiftly carrying screw 10 with its blades 12 rapidly around, thus drawing in the air as shown by the arrows; and, inasmuch as a horn 2 becomes narrower and smaller, the air will be condensed and pass out of the orifice 4 with great force and rapidity, striking the cup-shaped disc 14; this will assist and will help the aeroplane on its course; any exhaust or surplus air will pass off through the exhaust cups or ears 23. If it is desired to steer the aeroplane up or down the operator manipulates the guide rod 19, thus tilting the disc 14 inwardly or outwardly on the ball-bearing joint 15, 16, thus having a greater space for the air to travel upwardly or downwardly accordingly, as said disc is tilted and likewise if the operator desires to tilt said plate sidewise or laterally, it is done by manipulating the steering or guide rod 22; in other words, by this tilting motion a greater or less amount of air is allowed to strike said disc and to strike it at varying angles which are necessary to attain the proper course for the aeroplane. The ears 13 assist in guiding the air into the mouth of the horn.

By the use of this device, assistance being given for the manipulation of the aeroplane it will be seen that less gasoline will be used, consequently the aeroplane can be operated at less cost, and a given amount of gasoline will carry the machine to a greater distance, and less power and exertion from the engine will be needed in driving the aeroplane on account of the auxiliary force furnished by my device.

It will be apparent that this apparatus will be of great assistance to the pilot in operating his machine. It will also be obvious that this apparatus can be used in connection with motor propelled boats and the like.

While I have described one specific means for carrying out my invention, I do not wish to confine myself to any specific construction, and may alter the same to some extent and still fall within the scope of this specification.

What I claim as new and my invention and desire to secure by Letters Patent is:

1. In a device of the character described, an element for the intake and outlet of air, means for drawing in said air, said element being wide at its mouth and contracted at its outlet so that the air therein will be compressed, a cup-shaped disc supported near the air outlet and mounted on an universal joint, the air at the outlet forced to impinge against said disc with great velocity and density.

2. In a device of the character described, an element for the intake and outlet of air, means for drawing in said air, said element being wide at its mouth and contracted at its outlet so that the air therein will be compressed, a cup-shaped disc supported near the air outlet and mounted on an universal joint, the air at the outlet forced to impinge against said disc with great velocity and density, the guiding or steering rods of an aeroplane, each connected at one of their ends by a movable joint to said disc, enabling the operator to tilt said disc so that the same will assume various positions to enable a greater or less amount of air to pass out at a given point or points between said disc and the outlet of said air intake element, to guide the machine in its course.

In testimony whereof, I affix my signature at Cincinnati, Ohio, this 2nd day of September, 1921.

MAHLON CLAUDE SOUTH.